(12) United States Patent
Rockwell (10) Patent No.: US 8,983,259 B2
(45) Date of Patent: Mar. 17, 2015

(54) MULTI-FUNCTION BEAM DELIVERY FIBERS AND RELATED SYSTEM AND METHOD

(75) Inventor: David A. Rockwell, Culver City, CA (US)

(73) Assignee: Raytheon Company, Waltham, MA (US)

( * ) Notice: Subject to any disclaimer, the term of this patent is extended or adjusted under 35 U.S.C. 154(b) by 194 days.

(21) Appl. No.: 13/464,370

(22) Filed: May 4, 2012

(65) Prior Publication Data

US 2013/0294728 A1 Nov. 7, 2013

(51) Int. Cl.
*G02B 6/02* (2006.01)
*G02B 6/42* (2006.01)

(52) U.S. Cl.
CPC .......... *G02B 6/02042* (2013.01); *G02B 6/4296* (2013.01)
USPC ........................................................ 385/126

(58) Field of Classification Search
None
See application file for complete search history.

(56) References Cited

U.S. PATENT DOCUMENTS

| | | |
|---|---|---|
| 4,000,416 A | 12/1976 | Goell |
| 4,103,179 A | 7/1978 | Schmidt |
| 4,295,738 A * | 10/1981 | Meltz et al. ..................... 356/32 |
| 4,324,491 A | 4/1982 | Hueber |
| 4,538,274 A | 8/1985 | George |
| 4,618,783 A | 10/1986 | Pradere et al. |
| 4,821,272 A | 4/1989 | Bruesselbach et al. |
| 5,062,112 A | 10/1991 | Buchman et al. |
| 5,090,016 A | 2/1992 | Dewhirst et al. |
| 5,153,887 A | 10/1992 | Krapchev |
| 5,208,699 A | 5/1993 | Rockwell et al. |
| 5,418,880 A * | 5/1995 | Lewis et al. .................... 385/123 |
| 5,566,196 A * | 10/1996 | Scifres ............................... 372/6 |
| 5,673,281 A | 9/1997 | Byer |

(Continued)

FOREIGN PATENT DOCUMENTS

| | | |
|---|---|---|
| EP | 1 081 813 A2 | 3/2001 |
| JP | 1-92936 A * | 4/1989 |
| WO | WO 2011/146407 A1 | 11/2011 |

OTHER PUBLICATIONS

"Blimplike surveillance craft set to deploy over Maryland heighten privacy concerns", The Washington Post, published Jan. 22, 2014, url http://www.washingtonpost.com/business/technology/blimplike-surveillance-crafts-set-to-deploy-over-maryland-heighten-privacy-concerns/2014/01/22/71a48796-7ca1-11e3-95c6-0a7aa80874bc_print.html.*

(Continued)

*Primary Examiner* — Mike Stahl (57) ABSTRACT

An optical fiber includes multiple cores and a cladding. At least one of the multiple cores forms an optical waveguide and has an elongated cross-section with a narrower dimension in a fast-axis direction and a wider dimension in a slow-axis direction. The cladding surrounds the multiple cores and has a refractive index that differs from at least one refractive index of the multiple cores. The multiple cores could be stacked such that a first of the multiple cores is located at least partially over a second of the multiple cores in the fast-axis direction. The optical fiber could include an additional core within the cladding and having a substantially circular cross-section. The cores could be used to transport a high-power laser beam, an illumination laser beam, and an alignment laser beam. The optical fiber could have a length of at least two meters.

28 Claims, 3 Drawing Sheets

(56) References Cited

U.S. PATENT DOCUMENTS

| | | | |
|---|---|---|---|
| 5,689,578 A * | 11/1997 | Yamauchi et al. | 385/123 |
| 5,734,773 A | 3/1998 | Teshima et al. | |
| 5,848,215 A | 12/1998 | Akasaka et al. | |
| 5,851,259 A | 12/1998 | Clayton et al. | |
| 6,529,464 B2 | 3/2003 | Wilde et al. | |
| 6,542,683 B1 | 4/2003 | Evans et al. | |
| 6,580,860 B1 | 6/2003 | Varner | |
| 6,751,240 B2 | 6/2004 | Arisawa et al. | |
| 6,772,611 B2 | 8/2004 | Kliner et al. | |
| 6,904,219 B1 * | 6/2005 | Fermann | 385/130 |
| 6,947,652 B2 | 9/2005 | Varner et al. | |
| 6,961,171 B2 * | 11/2005 | Byren et al. | 359/333 |
| 6,965,469 B2 | 11/2005 | Avizonis et al. | |
| 7,010,195 B2 | 3/2006 | Westbrook | |
| 7,042,631 B2 | 5/2006 | Smith et al. | |
| 7,072,367 B2 | 7/2006 | Arisawa et al. | |
| 7,120,323 B2 | 10/2006 | Dyott et al. | |
| 7,639,909 B2 | 12/2009 | Murshid et al. | |
| 7,646,957 B2 | 1/2010 | Blauvelt et al. | |
| 7,804,863 B2 | 9/2010 | Adel et al. | |
| 7,860,360 B2 | 12/2010 | Rockwell et al. | |
| 7,865,048 B2 | 1/2011 | McCaughan et al. | |
| 7,983,312 B2 | 7/2011 | Shkunov et al. | |
| 8,036,252 B2 | 10/2011 | Islam | |
| 2004/0190825 A1 | 9/2004 | Kang et al. | |
| 2004/0233941 A1 | 11/2004 | Fajardo et al. | |
| 2005/0111803 A1 | 5/2005 | Bickham | |
| 2007/0171119 A1 * | 7/2007 | Dwelly et al. | 342/28 |
| 2008/0131065 A1 | 6/2008 | Windeler et al. | |
| 2008/0226241 A1 | 9/2008 | Sugizaki et al. | |
| 2008/0259969 A1 | 10/2008 | Piper et al. | |
| 2010/0008624 A1 * | 1/2010 | Singer et al. | 385/24 |
| 2010/0044102 A1 | 2/2010 | Rinzler et al. | |
| 2010/0189392 A1 | 7/2010 | Rockwell et al. | |
| 2010/0189401 A1 | 7/2010 | Shkunov et al. | |
| 2010/0195194 A1 | 8/2010 | Chen et al. | |
| 2011/0128538 A1 | 6/2011 | Cerullo et al. | |
| 2011/0218431 A1 | 9/2011 | Fink et al. | |
| 2011/0306956 A1 | 12/2011 | Islam | |
| 2012/0155107 A1 * | 6/2012 | Cottrell et al. | 362/553 |
| 2012/0206793 A1 * | 8/2012 | Tanaka | 359/341.3 |
| 2012/0236881 A1 | 9/2012 | Nikolajsen et al. | |
| 2012/0263196 A1 | 10/2012 | Pask et al. | |
| 2012/0275475 A1 | 11/2012 | Shkunov et al. | |
| 2012/0330959 A1 * | 12/2012 | Kretz et al. | 707/739 |
| 2013/0020486 A1 | 1/2013 | Zhang et al. | |
| 2013/0043392 A1 | 2/2013 | Mildren | |
| 2013/0108206 A1 * | 5/2013 | Sasaoka et al. | 385/11 |
| 2013/0177273 A1 * | 7/2013 | Alfano et al. | 385/11 |

OTHER PUBLICATIONS

Notification of transmittal of the International Search Report and the Written Opinion of the International Searching Authority, or the Declaration dated Feb. 15, 2011 in connection with International Patent Application No. PCT/US2012/069279.

Masaharu Ohashi, et al., "Design of Strain-Free-Fiber with Nonuniform Dopant Concentration for Stimulated Brillouin Scattering Suppression", Journal of Lightwave Technology, vol. 11, No. 12, Dec. 1993, p. 1941-1945.

Liang Dong, "Limits of Stimulated Brillouin Scattering Suppression on Optical Fibers With Transverse Acoustic Waveguide Designs", Journal of Lightwave Technology, vol. 28, No. 21, Nov. 1, 2010, p. 3156-3161.

Peter D. Dragic, et al., "Optical Fiber With an Acoustic Guiding Layer for Stimulated Brillouin Scattering Suppression", 2005 Conference on Lasers & Electro-Optics (CLEO), 2005, p. 1984-1986.

Marc D. Mermelstein, "SBS threshold measurements and acoustic beam propagation modeling in guiding and anti-guiding single mode optical fibers", Optics Express, vol. 17, No. 18, Aug. 31, 2009, p. 16225-16237.

"Suppression of SBS by Discontinuous Brillouin Frequency Shifted Fibre in CPFSK Coherent Lightwave System with Booster Amplifier", Electronics Letters, vol. 27, No. 14, Jul. 4, 1991, p. 1231-1233.

Mitsuhiro Tateda, et al., "Suppression of stimulated Brillouin scattering in a strain-free single-mode optical fiber with nonuniform dopant concentration along its length", OFC/IOOC '93 Technical Digest, 1993, p. 205-206.

Donnell Walton, et al., "Kilowatt-level, narrow-linewidth capable fibers and lasers", Proc. of SPIE vol. 6453, 2007, 10 pages.

M. D. Mermelstein, et al., "SBS suppression and acoustic management for high-power narrow-linewidth fiber lasers and amplifiers", Proc. of SPIE vol. 7580, 2010, 13 pages.

Craig Robin, et al., "Experimental studies of segmented acoustically tailored photonic crystal fiber amplifier with 494 W single-frequency output", Proc. of SPIE vol. 7914, 2011, 8 pages.

David A. Rockwell, Method and Apparatus for Fiber Delivery of High Power Laser Beams, U.S. Appl. No. 13/308,789, filed Dec. 1, 2011.

Ray E. McVey et al., "Method and Apparatus for Implementing a Rectangular-Core Laser Beam-Delivery Fiber That Provides Two Orthogonal Transverse Bending Degrees of Freedom", U.S. Appl. No. 13/308,812, filed Dec. 1, 2011.

Notification of Transmittal of the International Search Report and the Written Opinion of the International Searching Authority, or the Declaration dated Jul. 26, 2013 in connection with International Patent Application No. PCT/US13/25395.

Notification of Transmittal of the International Search Report and the Written Opinion of the International Searching Authority, or the Declaration dated May 30, 2013 in connection with International Patent Application No. PCT/US13/25404.

Notification of Transmittal of the International Search Report and the Written Opinion of the International Searching Authority, or the Declaration dated May 10, 2013 in connection with International Patent Application No. PCT/US2013/028923.

Office Action dated Sep. 10, 2014 in connection with U.S. Appl. No. 13/308,789, 14 pages.

Office Action dated Dec. 4, 2014 in connection with U.S. Appl. No. 13/308,812, 23 pages.

* cited by examiner

MULTI-FUNCTION BEAM DELIVERY FIBERS AND RELATED SYSTEM AND METHOD

CROSS-REFERENCE TO RELATED APPLICATIONS

This application is related to the following U.S. patent applications:
U.S. patent application Ser. No. 13/308,789 entitled "Method and Apparatus for Fiber Delivery of High Power Laser Beams" filed on Dec. 1, 2011; and
U.S. patent application Ser. No. 13/308,812 entitled "Method and Apparatus for Implementing a Rectangular-Core Laser Beam-Delivery Fiber that Provides Two Orthogonal Transverse Bending Degrees of Freedom" filed on Dec. 1, 2011.
Both of these applications are hereby incorporated by reference.

TECHNICAL FIELD

This disclosure is directed in general to laser systems. More specifically, this disclosure is directed to multi-function beam delivery fibers and a related system and method.

BACKGROUND

Optical fibers are routinely used in various fields, such as in industrial and medical applications, to transport laser beams from laser sources to desired locations. In these types of applications, ordinary optical fibers with small circular cores are suitable for transporting lower-power laser beams. These types of optical fibers can be easily routed and rerouted in real-time to support various functions.

In order to transport higher-power beams, larger cores are typically needed in the optical fibers. However, conventional optical fibers with large circular cores are often unsuitable for use in higher-power applications, such as high-power military applications that use laser beams of 10 kW or more. For instance, conventional optical fibers with large circular cores are typically highly multi-modal and/or produce excessive diffraction. As a result, it is often difficult for these optical fibers to satisfy both output power requirements and output beam quality requirements. Also, conventional optical fibers with large circular cores typically lack flexibility, which can interfere with their use in certain applications.

Large mode area (LMA) optical fibers that can provide higher quality beam transport have been developed. However, the power they can transport is often limited by a number of processes, including optical damage and stimulated Raman scattering (SRS) or stimulated Brillouin scattering (SBS) when they exceed several meters in length. These power and length limitations prevent LMA optical fibers from being used in certain applications.

SUMMARY

This disclosure provides multi-function beam delivery fibers and a related system and method.

In a first embodiment, an optical fiber includes multiple cores and a cladding. At least one of the multiple cores forms an optical waveguide and has an elongated cross-section with a narrower dimension in a fast-axis direction and a wider dimension in a slow-axis direction. The cladding surrounds the multiple cores and has a refractive index that differs from at least one refractive index of the multiple cores.

In a second embodiment, a method includes generating multiple laser beams and arranging the laser beams for entry into multiple cores of an optical fiber. At least one of the multiple cores forms an optical waveguide and has an elongated cross-section with a narrower dimension in a fast-axis direction and a wider dimension in a slow-axis direction. The method further includes transporting the laser beams using the optical fiber. A cladding surrounds the multiple cores and has a refractive index that differs from at least one refractive index of the multiple cores.

In a third embodiment, a system includes multiple lasers configured to generate multiple laser beams and an optical fiber configured to transport the multiple beams. The optical fiber includes one or more cores configured to transport the multiple beams. At least one of the one or more cores forms an optical waveguide and has an elongated cross-section with a narrower dimension in a fast-axis direction and a wider dimension in a slow-axis direction. The optical fiber also includes a cladding surrounding the one or more cores and having a refractive index that differs from at least one refractive index of the one or more cores.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

FIGS. 1 through 7, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

Figure 1:
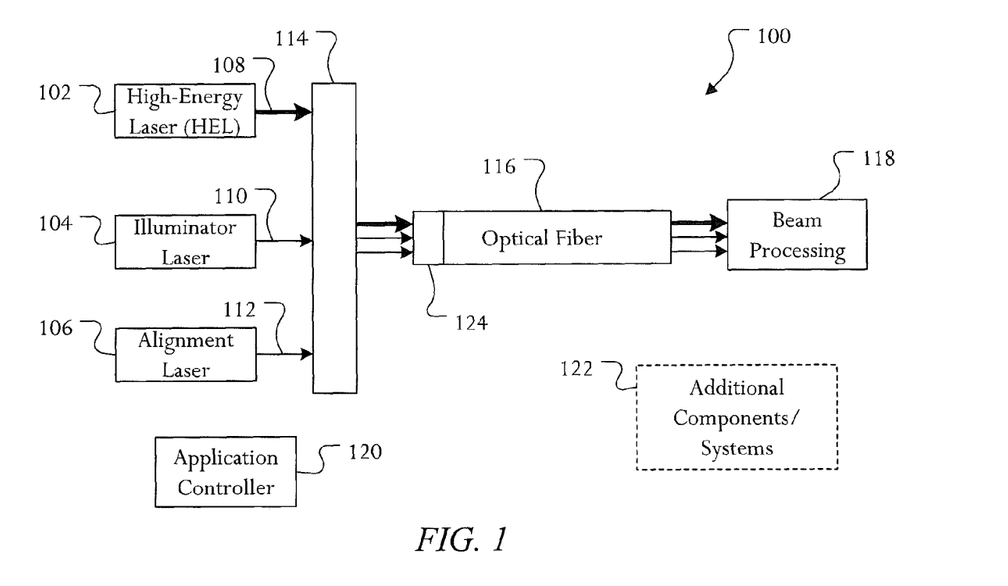
FIG. 1 illustrates an example laser system having a multi-function beam delivery fiber in accordance with this disclosure.

FIG. 1 illustrates an example laser system 100 having a multi-function beam delivery fiber in accordance with this disclosure. As shown in FIG. 1, the system 100 includes lasers 102-106 that generate output beams 108-112, respectively. In this example, the lasers 102-106 generate different types of beams for different purposes or functions. For example, the laser 102 represents a high-energy laser or "HEL", which generates a high-power output beam 108. A high-power output beam 108 is generally any laser beam having a high power level, typically about 10 kW or greater. Example high-power lasers 102 could generate output beams 108 of about 50 kW, 100 kW, 150 kW, 200 kW, or more. The high-power laser 102 represents any suitable laser source configured to generate a high-power laser output.

The laser 104 represents an illuminator laser, which generates an illumination laser beam 110 used to illuminate or "paint" a target. The average power of the illumination beam 110 is typically much lower than the average power of the output beam 108. The average power of the illumination beam 110 could, for instance, be about 1 kW. The illuminator laser 104 represents any suitable laser source configured to generate an illumination laser output.

The laser 106 represents an alignment laser, which generates an alignment laser beam 112 used to verify proper alignment of the beams 108-112. The alignment beam 112 is typically a very low-power beam. The average power of the alignment beam 112 could, for instance, be about 1 W. The alignment laser 106 represents any suitable laser source configured to generate an alignment laser output.

Figure 2:
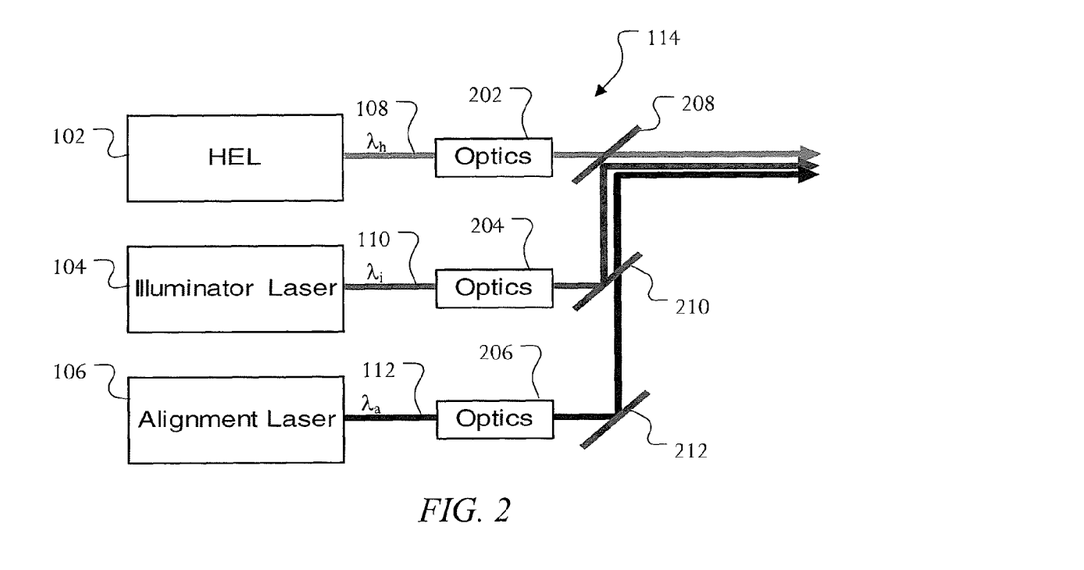
FIG. 2 illustrates an example beam combiner in the laser system of FIG. 1 in accordance with this disclosure.

The beams 108-112 are received at a beam combiner 114, which combines or otherwise arranges the beams 108-112 in a manner suitable for transport over an optical fiber 116. As described in more detail below, the beam combiner 114 could arrange multiple beams to enter into a common core of the optical fiber 116, and/or the beam combiner 114 could arrange multiple beams to enter different cores of the optical fiber 116. The beam combiner 114 includes any suitable structure for arranging multiple beams for transport through a common optical fiber. One example implementation of the beam combiner 114 is shown in FIG. 2, which is described below.

The optical fiber 116 transports the beams 108-112 to an intended destination. The optical fiber 116 includes any suitable structure for carrying multiple laser beams, such as multiple high-power laser beams or at least one high-power laser beam and at least one other laser beam (such as an illumination beam and/or an alignment beam). Example implementations of the optical fiber 116 are shown in FIGS. 3 through 6, which are described below. Each implementation of the optical fiber 116 includes at least one rectangular or other elongated (non-circular) core for transporting at least a high-power laser beam. In particular embodiments, the optical fiber 116 represents a passive device, meaning the optical fiber 116 transports but does not create or amplify the beams 108-112.

In this example, one or more beam processing components 118 handle and/or modify the beams 108-112. The beams 108-112 can be handled or modified in any suitable manner depending on the application. In particular applications, for example, the beam processing components 118 could include a beam director for directing the beams in a particular direction or towards a specified target. Any other or additional functions could be performed by the beam processing components 118 according to particular needs.

An application controller 120 is configured to perform various operations to support one or more applications that involve the system 100. For example, the application controller 120 could control the generation of different beams 108-112 by the lasers 102-106. Note that the system 100 shown here could find use in a wide variety of applications, including military-related applications, and the operations performed by the application controller 120 can vary depending on which application or applications are supported using the system 100. The application controller 120 includes any suitable structure for controlling the generation of various laser beams 108-112. For instance, the application controller 120 could include at least one processor, microprocessor, microcontroller, digital signal processor (DSP), application specific integrated circuit (ASIC), field programmable gate array (FPGA), or other computing or processing device(s).

One or more additional components/systems 122 support any other necessary or desired features to be used in particular applications with the system 100. For example, in military applications that use the high-power laser 102 to strike targets, the additional components/systems 122 could include an acquisition and tracking system used to identify and track the targets. Location information can be used by the system 100 to direct the output beam(s) toward(s) the targets. Any other suitable components or systems can be used in conjunction with the lasers 102-106.

As described above, the optical fiber 116 includes at least one rectangular or other elongated core for transporting at least the high-power beam 108. This core represents a high aspect ratio core (HARC) and can have any suitably high width-to-height ratio in its cross-section, such as about 30:1 to about 100:1 or even more. The other beams 110-112 could be transported in the same core or in one or more different cores of the optical fiber 116, and the beams 110-112 can perform complementary functions in a fully integrated HEL system.

One challenge in this type of system is to design a multi-function beam-delivery fiber 116 that accommodates all of the various types of beams while meeting rigorous boresight-alignment tolerances among the beams. Attempting to transport multiple beams over separate optical fibers would likely be inadequate, since the multiple beams would have to be precisely aligned once they emerge from the fibers. Moreover, using a single fiber with a large circular core as the optical fiber 116 is typically undesirable since it would likely be highly multi-modal and/or produce excessive diffraction, and use of a large mode area (LMA) fiber is usually limited to lower powers and fiber lengths of only a few meters.

In FIG. 1, the beams 108-112 are transported using a single optical fiber 116, so the beams' relative pointing directions can be automatically maintained as they exit the fiber 116. In some embodiments, the high-power laser 102 represents a continuous wave laser that operates at a wavelength of about 1 μm and that generates a minimum output power of about 100 kW with a beam quality requirement of about two or better. Also, in some embodiments, the illuminator laser 104 represents a pulsed laser that operates in the same wavelength range as the high-power laser 102 (although at a different specific wavelength) with a maximum pulse length of about 100 ns, a pulse repetition frequency of about 50 kHz, and a spectral bandwidth in a range from about 10 GHz to about 30 GHz. The illuminator laser 104 could have an average output power around about 1 kW, but it can generate higher peak powers since it is pulsed. Under these conditions, stimulated Brillouin scattering represents a realistic performance challenge to fiber delivery at lengths of ten meters or more. However, the elongated core(s) of the optical fiber 116 can handle these beams without suffering optical damage, significant attenuation, or significant degradation in beam quality. This is possible even for fiber lengths over several meters, including fiber lengths between three and one hundred meters. In addition, in some embodiments, the alignment laser 106 represents a laser source that outputs a low-power beam at a visible or near-infrared wavelength, such as a beam of about 1 W at about 800 nm. This beam does not pose challenges from damage, SBS, or any other intensity-dependent process, but the optical fiber 116 still propagates this beam 112 along with the other beams 108-110 while maintaining diffraction-limited beam quality.

In particular embodiments, the optical fiber 116 satisfies the following requirements in addition to the ability to accommodate multiple beams. The optical fiber 116 is rectangular with at least one high aspect ratio core. The narrow dimension of that core is single-mode or supports a limited number of modes (such as two to seven modes) to match the beam quality of the high-power laser beam(s) as closely as is practical. The wide dimension of the core can be about 1 mm (making it highly multi-modal) to accommodate a high-power beam (such as a 100 kW beam), although an increased width can be used for additional margin. In order to maintain mechanical flexibility in the narrow dimensions, the narrow fiber dimension could be no more than about 0.5 mm. Although free-space launching of the beams 108-112 into the fiber 116 is acceptable, the fiber 116 may be compatible with some type of optical coupler 124 for launching the beams 108-112 into the fiber 116, as this can significantly reduce susceptibility to misalignments. The optical coupler 124 represents any suitable structure for launching multiple beams into an optical fiber. For instance, the optical coupler 124 could include at least one free-space lens or mirror. The optical coupler 124 could also include a fused, all-glass coupler that may optionally be attached to the end of the fiber 116 using a fusion splice, bonding, or other coupling technique.

Various known optical fibers or waveguides violate one or more of these requirements. For example, known optical fibers typically include circular or annular cores, cores that are too small for high-power applications, and/or cores that cannot be fabricated at longer lengths (such as about ten meters or more). The various embodiments of the optical fibers 116 described below can satisfy the above requirements, rendering these optical fibers 116 suitable for use in various high-power applications. Moreover, since these optical fibers 116 can exceed several meters in length, this allows laser sources (such as lasers 102-106) to be placed in more suitable locations on an aircraft or other structure, even if those locations are remote from the beam processing components 118.

Although FIG. 1 illustrates one example of a laser system 100 having a multi-function beam delivery fiber 116, various changes may be made to FIG. 1. For example, the optical fiber 116 could be used to transport any number of high-power output beams and any number of additional beams. Also, the layout of the system 100 in FIG. 1 is for illustration only.

FIG. 2 illustrates an example beam combiner 114 in the laser system 100 of FIG. 1 in accordance with this disclosure. As shown in FIG. 2, the beam combiner 114 includes optics 202-206, dichroic filters 208-210, and a mirror 212. These components operate so that the beams 108-112 from the lasers 102-106 can be arranged and provided to the launch end of the optical fiber 116. In this example, the beams 108-112 have wavelengths of $\lambda_h$, $\lambda_i$, and $\lambda_a$, respectively.

Optics 202 can focus or otherwise process the high-power beam 108, which is provided to the dichroic filter 208. Optics 204 can focus or otherwise process the illumination beam 110, which is provided to the dichroic filter 210. Optics 206 can focus or otherwise process the alignment beam 112, which is provided to the mirror 212. The optics 202-206 include any suitable structures for preparing beams for insertion into an optical fiber. For instance, the optics 202-206 can be used to provide the desired beam shapes and pointing directions required to launch the beams 108-112 into the fiber 116.

The mirror 212 is highly reflective (such as about 100%) at the wavelength $\lambda_a$ of the alignment beam 112. The dichroic filter 210 is highly transmissive (such as about 100%) at the wavelength $\lambda_a$ of the alignment beam 112 and highly reflective (such as about 100%) at the wavelength $\lambda_i$ of the illumination beam 110. The dichroic filter 208 is highly transmissive (such as about 100%) at the wavelength $\lambda_h$ of the high-power beam 108 and highly reflective (such as about 100%) at the wavelengths $\lambda_i$ and $\lambda_a$ of the illumination and alignment beams 110-112. The beams 108-112 are provided from the dichroic filter 208 to the optical fiber 116, possibly through one or more optical couplers 124. Each dichroic filter 208-210 includes any suitable structure for passing light at one or more wavelengths and reflecting light at other wavelengths. The mirror 212 includes any suitable structure that is highly reflective at the wavelength of the alignment beam 112.

Note that while the three beams 108-112 are shown here as entering the optical fiber 116 side-by-side, this arrangement is for illustration only. The actual arrangement of the beams 108-112 depends on the structure of the optical fiber 116. The beams 108-112 could be collinear or separated depending on the design of the delivery fiber.

In particular embodiments, the high-power beam 108 and the illumination beam 110 have a wavelength separation of about 30 nm to about 60 nm. This separation allows the filter 208 to spectrally combine the beams 108-110. The alignment beam 112 could be at least 200 nm apart from the other beams 108-110, again providing an adequate spectral spacing for combination with the other beams 108-110.

Although FIG. 2 illustrates one example of the beam combiner 114 in the laser system 100 of FIG. 1, various changes may be made to FIG. 2. For example, the beams 108-112 could be combined or otherwise arranged in any other suitable manner. Also, any number of high-power output beams and any number of additional beams could be combined for transport over the optical fiber 116.

FIGS. 3 through 6 illustrate example optical fibers 300-600 in the laser system 100 of FIG. 1 in accordance with this disclosure. These optical fibers 300-600 could be used as the optical fiber 116 in the system 100 of FIG. 1. Note, however, that these optical fibers 300-600 could be used in any other suitable system.

In general, the multi-function beam delivery fiber 116 can be designed in a number of ways depending on the specific requirements of a given application. In the following discussion, attention is first made with respect to accommodating the high-power beam 108 and the illumination beam 110, followed by techniques for including the alignment beam 112 in the optical fiber.

Figure 3:
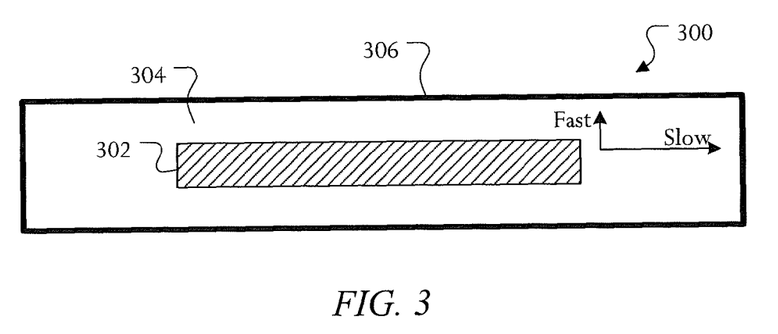
FIGS. 3 through 6 illustrate example multi-function beam delivery fibers in the laser system of FIG. 1 in accordance with this disclosure.

When a high-power beam 108 and an illumination beam 110 have comparable beam qualities, an optical fiber 300 as shown in FIG. 3 can be used. As shown in FIG. 3, the beams 108-110 are co-aligned as they enter the fiber 300, and the beams 108-110 remain co-aligned when they exit the fiber 300 and exit the overall system on a path down range. In this case, the fiber 300 can use a single rectangular or other elongated core 302 that carries both beams 108-110. The core 302 represents an optical waveguide and is surrounded by a cladding 304, and a coating 306 covers the cladding 304.

As shown here, the core 302 is narrower in a fast-axis direction and wider in a slow-axis direction. The fiber 300 itself can be flexible in the fast-axis direction and more rigid in the slow-axis direction, and the fiber 300 can extend for lengths up to ten meters or more. The fiber 300 could also be dynamically flexed while in use, such as when the fiber 300 is used to provide beams to a beam director that moves to track one or more targets. As noted above, the narrow dimension of the core 302 can be single-mode or support a limited number of modes (such as two to seven modes) to match the beam qualities of the beams 108-110 as closely as possible. The narrow dimension of the core 302 can also be narrow enough to provide mechanical flexibility in that direction. The wide dimension of the core 302 could be wide enough (such as about 1 mm or more) to accommodate a single-mode high-power beam 108.

In some implementations, the narrow or fast-axis dimension of the core 302 and its numerical aperture (NA) can be adapted to the desired beam quality. Based on the practice employed in fiber delivery for high-power industrial lasers, the dimensions of the core 302 could be designed to slightly exceed the actual beams' dimensions, thereby providing some alignment margin. The wide or slow-axis dimension of the core 302 can be specified based on the total beam power to be transmitted through the core 302. The wide dimension of the core 302 can also be specified so that both beams 108-110 can propagate along the entire length of the fiber 300 without exceeding the threshold for stimulated scattering or other performance-limiting processes that are intensity-dependent. As particular examples, the core 302 could have an aspect ratio between about 30:1 to about 100:1, although other aspect ratios could be used depending on the laser power and application. Also note that the core 302 could have any suitable cross-sectional area, including areas of about 10,000 $\mu m^2$, about 20,000 $\mu m^2$, about 30,000 $\mu m^2$, about 40,000 $\mu m^2$, or even more.

The optics 202-204 in FIG. 2 can generate high aspect ratio beam shapes for both beams 108-110 independent of their initial beam shapes. These optics 202-204 can also include mechanisms, such as alignment wedges, that allow the beams 108-110 to be aligned parallel to one another. The beams 108-110 can be spatially joined at the dichroic filter 208 and launched into the fiber 300. When the beams 108-110 exit the fiber 300, they continue to be treated as a single beam. For instance, they can be directed along a free-space path that includes a deformable mirror, a fast steering mirror, or local auto-alignment optics. This path can end as the beams 108-110 are sent down range.

When a high-power beam 108 and an illumination beam 110 have different beam qualities, various optical fibers could be used. One option is to use a single core large enough to accommodate the beam with the worse beam quality, and the beam quality of the other beam is allowed to degrade as it propagates through a dynamically flexing fiber. This performance degradation may be a reasonable trade to make in favor of a simpler fiber design. In this case, the fiber 300 shown in FIG. 3 could be used, where the dimensions of the core 302 accommodate the beam with the worse beam quality.

Figure 4:
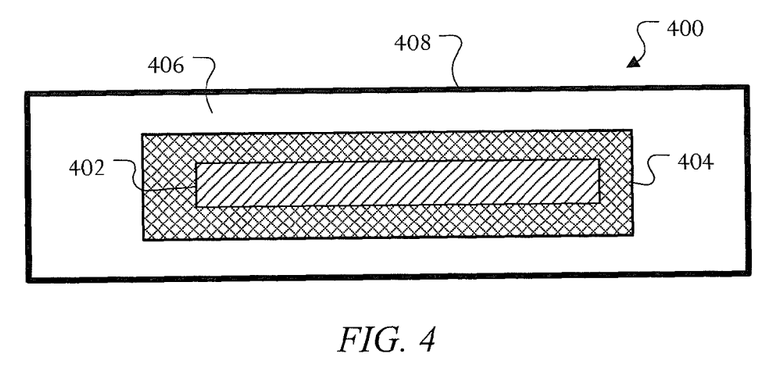

A second option is shown in FIG. 4, where an optical fiber 400 has multiple rectangular or other elongated coaxial cores 402-404 with different fast-axis dimensions and/or numerical apertures. The cores 402-404 are surrounded by a cladding 406 and a coating 408. In this case, the wavelengths that the cores 402-404 are designed for correspond to the high-power beam 108 and the illumination beam 110. The inner core 402 can be designed to support the beam having the better beam quality (such as the high-power beam 108), while the outer core 404 can be designed to support the beam having the worse beam quality (such as the illumination beam 110). Given the quality of state-of-the-art fiber fabrication, the two beams 108-110 would be rigorously coaxial and pointing in the same direction as they exit the fiber 400.

Figure 5:
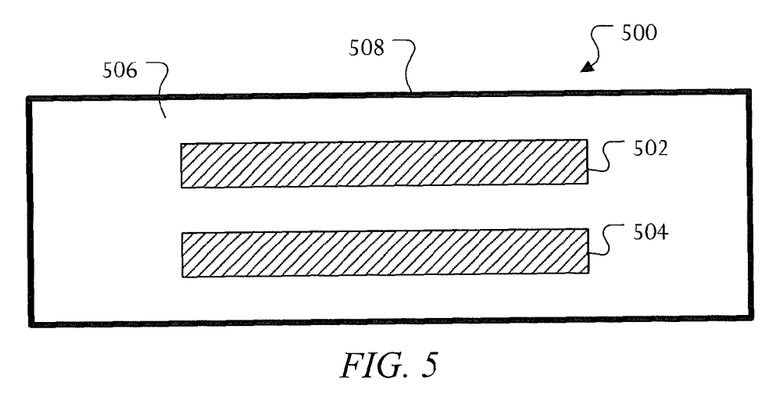

A third option is shown in FIG. 5, where an optical fiber 500 has multiple fully independent cores 502-504, one for each beam 108-110. The cores 502-504 are surrounded by a cladding 506 and a coating 508. In this case, the cores 502-504 could have the same vertical heights or different vertical heights, and the widths of the cores 502-504 may or may not be equal. Also, the thicknesses of the cladding 506 below the core 502, between the cores 502-504, and above the core 504 may or may not be equal. For example, the dimensional fidelity of the final core shapes might be improved if the cladding 506 is thicker between the cores 502-504 than above and below the cores 502-504. It may also be that the thickness of the cladding 506 above the core 502 is less than the thickness of the cladding 506 below the core 504 to improve its bend performance. In particular embodiments, the total height of the entire fiber 500 may be no more than about 0.5 mm so the fiber 500 can accommodate dynamic mechanical flexing present in some beam-delivery applications. In the configuration shown in FIG. 5, the cores 502-504 represent multiple stacked planar waveguides within a common optical fiber. The cores 502-504 are said to be stacked since one core is placed at least partially over the other core in a direction parallel to the fast axis.

Figure 6:
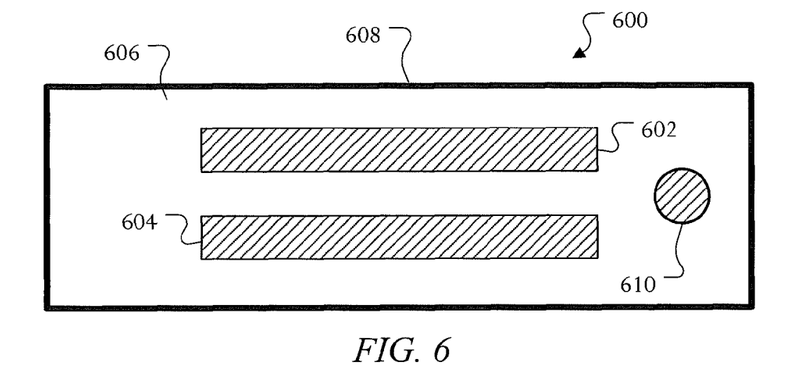

The alignment beam 112 can be transported through an optical fiber in any suitable manner. In some embodiments, the alignment beam 112 is single-mode at a wavelength in the visible or near-infrared spectral region, and several options exist for a single-mode core to transport this beam 112. For example, a circular single-mode core could be located anywhere in the cladding of any of the optical fibers described above. An example implementation of this is shown in FIG. 6, which illustrates an optical fiber 600 that is similar to the optical fiber 500. In this example, the optical fiber 600 includes multiple elongated cores 602-604, a cladding 606, a coating 608, and a circular core 610. The core 610 could represent a small, single-mode core suitable for transporting the alignment beam 112. As another example, a circular single-mode core could be coaxial with the core(s) for the other beams 108-110. As a third example, a circular single-mode core could be located within the core(s) for the other beams 108-110 but displaced from the common axis of other two beams 108-110. Since the alignment beam 112 operates at a low power and is single-mode, the core design for this beam is readily available in the art.

Each core in the optical fibers 300-600 can be formed from any suitable material(s), such as silica. Each cladding in the optical fibers 300-600 can be formed from any suitable material(s), such as at least one optical cladding material having a refractive index that is different than the refractive index of the core(s). Each coating in the optical fibers 300-600 can be formed from any suitable material(s), such as a polymer. Also, each of the optical fibers 300-600 can be fabricated in any suitable manner. For instance, after accurate selection and purification of glass material for a core, a fiber draw process can be used to create the core of an optical fiber. Accurate control of the temperature uniformity during the fiber draw process can help to increase the quality of the fabricated core. A fiber draw process can allow scaling of the optical fibers to lengths of ten meters or more.

As noted above, the optical fibers 300-600 can be designed to satisfy certain stimulated Brillouin scattering (SBS) requirements. With respect to the illumination beam 110, the peak power of the beam 110 may be high enough to exceed the steady-state SBS threshold of an optical fiber. For a ten-meter 10,000 $\mu m^2$ core silica fiber, the peak power of the beam 110 may exceed the steady-state SBS threshold by a factor of around 200 or more. As a result, a technique for suppressing SBS in the delivery fiber by a factor of at least 200 could be used. In particular embodiments, one or more of the following three techniques could be used for SBS suppression. These three techniques can be applied with relatively minor engineering impact on the remainder of the system 100.

In a first technique, it is well established that the SBS threshold can be significantly increased by using beams having broad spectral widths. For example, the SBS gain bandwidth $\delta v_B$ of fused silica for a wavelength of 1 μm is about 40 MHz, and the SBS threshold power as a function of the signal bandwidth $\delta v$ increases approximately as the ratio $\delta v / \delta v_B$. In some embodiments, the illuminator spectral width allows a range from about 10 GHz to about 30 GHz. Assuming a frequency at the high end of this range is selected, the effective SBS gain is reduced by a factor of 750 (30 GHz/40 MHz), which takes the system below the SBS threshold. Even though the peak power of the illumination beam 110 exceeds the average power of the high-power beam 108, selecting a judicious set of operating parameters for the illumination beam 110 can avoid SBS in the delivery fiber.

In a second technique, longitudinal variations in acoustic velocity are used. This technique recognizes that acoustic velocity and SBS frequency shift can be changed by incorporating various dopant ions into the fiber material. If a dopant-induced frequency shift exceeds the SBS gain bandwidth, one portion of the fiber is effectively decoupled from other portions of the fiber, thereby reducing the effective SBS interaction length and increasing the SBS threshold power. This technique can be exploited if the beam-delivery fiber is formed by splicing together two or more fiber sections. Each fiber section can have a different acoustic velocity associated with its specific concentration of one or more dopants, such as germanium or fluorine. This technique also recognizes that acoustic velocity and SBS frequency shift can be changed by operating different portions of the optical fiber at different temperatures. Even if this technique by itself provides inadequate SBS suppression at power levels such as 100 kW or more, it can certainly be used in other applications involving lower peak powers or in conjunction with one or more other SBS-suppression techniques to provide additional margin.

In a third technique, transverse variations in acoustic velocity are used. This technique also exploits the dopant-dependence of acoustic velocity, but it achieves SBS suppression using a prescribed transverse gradient in the dopant concentrations. In this approach, the following three things can be recognized. One, the acoustic wave involved in the SBS process has a wavelength that is half of the optical wavelength, so the acoustic wave can also be guided in a fiber core. Two, optical guiding in a fiber depends on the transverse profile of the refractive index, which is the factor by which the speed of light is reduced in an optical material relative to a vacuum. In an analogous manner, the degree of acoustic guiding depends on the "acoustic index" of the core material, which is associated with the relative value of the acoustic velocity in the material as a function of the dopant concentrations. Three, SBS depends on the spatial overlap of the optical and acoustic waves within the fiber material, so reducing this spatial overlap can raise the SBS threshold. The details of how a fiber core can be designed to exploit this type of SBS suppression are well known in the art. In general, the core design concentrates the optical wave along the fiber axis, while the acoustic wave tends to be concentrated in an annular region radially displaced from the core axis. This spatial separation of the optical and acoustic wave amplitudes reduces the effective SBS gain and raises the SBS threshold.

Stimulated Raman scattering (SRS) may also be a consideration in the design of the optical fibers 300-600. The SRS gain in fused silica is about 300 times weaker than the SBS gain. Therefore, according to the example above where the intensity of the illumination beam 110 exceeds the SBS threshold by a factor of about 200, the illuminator power would be about ⅔ of the SRS threshold level, so no SRS suppression is needed. If higher illuminator powers are used, any suitable suppression technique could be used to reduce SRS. For instance, the cross-sectional area of the fiber core transporting the illumination beam 110 could be increased, thereby maintaining or even reducing the signal intensity for the same signal power and avoiding any SRS.

Although FIGS. 3 through 6 illustrate examples of optical fibers 300-600 in the laser system 100 of FIG. 1, various changes may be made to FIGS. 3 through 6. For example, each fiber core could be placed at any suitable location within the cladding of an optical fiber and need not be centered. Also, the size and shape of each core shown in FIGS. 3 through 6 are for illustration only. In addition, while the optical fibers 300-600 are described as transporting a high-power beam and an illumination beam (and possibly an alignment beam), the optical fibers 300-600 could be used to transport multiple beams of any suitable type(s), and more than two or three beams could be transported.

Figure 7:
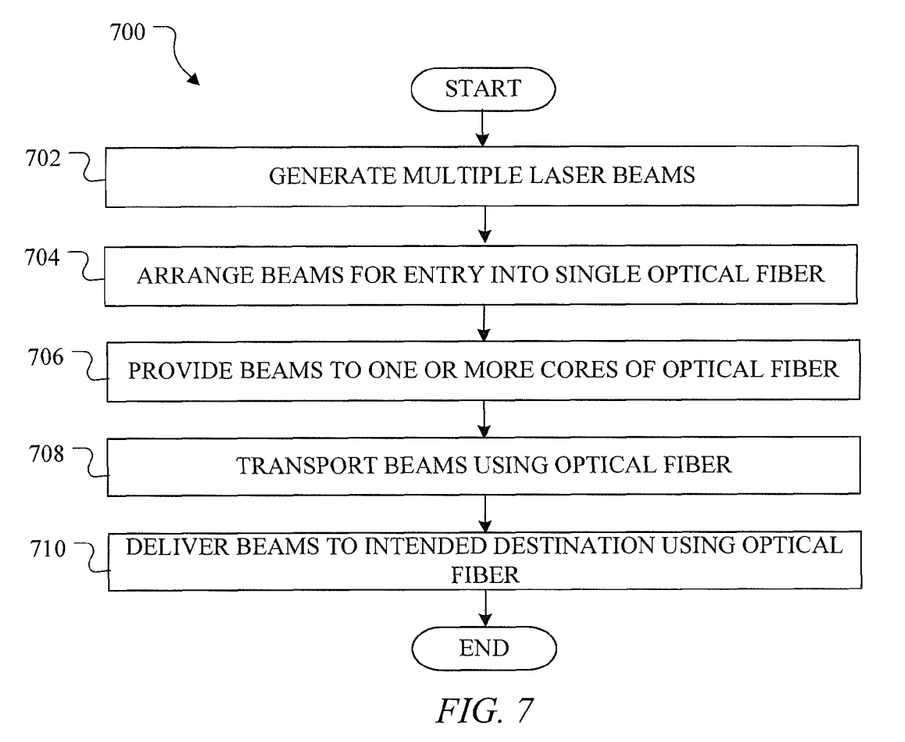
FIG. 7 illustrates an example method for using a multi-function beam delivery fiber in accordance with this disclosure.

FIG. 7 illustrates an example method 700 for using a multi-function beam delivery fiber in accordance with this disclosure. As shown in FIG. 7, multiple laser beams are generated at step 702. This could include, for example, different lasers 102-106 generating a high-power beam 108, an illumination beam 110, and an alignment beam 112. The multiple beams are arranged to enter a single optical fiber at step 704. This could include, for example, the beam combiner 114 arranging the beams 108-112 into suitable positions for entry into the optical fiber 114. The exact arrangement of the beams 108-112 can vary depending on the number and position(s) of the core(s) in the optical fiber 116. The beams 108-112 could be collinear or separated.

The beams are provided to one or more cores of the optical fiber at step 706. This could include, for example, using one or more optical couplers 124 to couple the beams 108-112 into one or more cores of the optical fiber 116. Free space coupling could also be used. As noted above, the beams 108-112 could be sent through a single core in the optical fiber (such as is shown in FIG. 3) or through multiple cores in the optical fiber (such as is shown in FIGS. 4 through 6). The beams are transported using the optical fiber at step 708 and delivered to an intended destination using the optical fiber at step 710. Any suitable components could use the beams at the destination, such as when a beam director aims the beams at one or more targets.

Although FIG. 7 illustrates one example of a method 700 for using a multi-function beam delivery fiber, various changes may be made to FIG. 7. For example, while shown as a series of steps, various steps in FIG. 7 can overlap, occur in parallel, or occur any number of times. Also, the method 700 could involve the generation and transport of any plural number and type(s) of beams.

It may be advantageous to set forth definitions of other certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An optical fiber comprising:
multiple cores, at least one of the multiple cores forming an optical waveguide and having an elongated cross-section with a narrower dimension in a fast-axis direction and a wider dimension in a slow-axis direction, wherein an aspect ratio of the wider dimension to the narrower dimension exceeds about 30 to 1; and
a cladding surrounding the multiple cores, the cladding having a refractive index that differs from at least one refractive index of the multiple cores.

2. The optical fiber of claim 1, wherein:
the multiple cores comprise first and second cores; and
the multiple cores are stacked such that the first core is located at least partially over the second core in the fast-axis direction.

3. The optical fiber of claim 1, wherein:
the multiple cores comprise first and second cores; and
the optical fiber further comprises an additional core within the cladding and separated from the first and second cores, the additional core having a substantially circular cross-section.

4. The optical fiber of claim 3, wherein:
the first core is configured to transport a high-power laser beam;
the second core is configured to transport an illumination laser beam; and
the additional core is configured to transport an alignment laser beam.

5. The optical fiber of claim 4, wherein:
the first core is configured to transport the high-power laser beam having an average power of at least about 50 kW;
the second core is configured to transport the illumination laser beam having an average power of at least about 1 kW; and
the additional core is configured to transport the alignment laser beam having an average power of around 1 W.

6. The optical fiber of claim 1, wherein:
the multiple cores comprise first and second cores; and
the first and second cores are coaxial.

7. The optical fiber of claim 1, wherein the optical fiber is mechanically flexible more in the fast-axis direction and less in the slow-axis direction.

8. The optical fiber of claim 1, wherein one or more of the multiple cores has a substantially rectangular cross-section.

9. An optical fiber comprising:
multiple cores, at least one of the multiple cores forming an optical waveguide and having an elongated cross-section with a narrower dimension in a fast-axis direction and a wider dimension in a slow-axis direction; and
a cladding surrounding the multiple cores, the cladding having a refractive index that differs from at least one refractive index of the multiple cores;
wherein the optical fiber has a length of at least two meters.

10. The optical fiber of claim 1, wherein the optical fiber is configured to suppress stimulated Brillouin scattering (SBS) using at least one of:
transport of at least one laser beam having a frequency selected so that a ratio $\delta v/\delta v_B$ of signal bandwidth $\delta v$ to SBS gain bandwidth $\delta v_B$ in the optical fiber increases SBS threshold power of the optical fiber;
longitudinal variations in acoustic velocity where different portions of the optical fiber contain different specific concentrations of one or more dopants;
longitudinal variations in acoustic velocity where different portions of the optical fiber operate at different temperatures; and
transverse variations in acoustic velocity having a transverse gradient in dopant concentrations in the optical fiber.

11. The optical fiber of claim 1, further comprising:
an optical coupler configured to launch multiple laser beams into the optical fiber.

12. An optical fiber comprising:
multiple cores, at least one of the multiple cores forming an optical waveguide and having an elongated cross-section with a narrower dimension in a fast-axis direction and a wider dimension in a slow-axis direction;
a cladding surrounding the multiple cores, the cladding having a refractive index that differs from at least one refractive index of the multiple cores; and
an optical coupler configured to launch multiple laser beams into the optical fiber, wherein the optical coupler comprises a fused, all-glass coupler that is physically attached to an end of the optical fiber.

13. A method comprising:
generating multiple laser beams;
arranging the laser beams for entry into multiple cores of an optical fiber, at least one of the multiple cores forming an optical waveguide and having an elongated cross-section with a narrower dimension in a fast-axis direction and a wider dimension in a slow-axis direction, wherein an aspect ratio of the wider dimension to the narrower dimension exceeds about 30 to 1; and
transporting the laser beams using the optical fiber;
wherein a cladding surrounds the multiple cores, the cladding having a refractive index that differs from at least one refractive index of the multiple cores.

14. The method of claim 13, wherein:
the multiple cores comprise first and second cores;
the multiple cores are stacked such that the first core is located at least partially over the second core in the fast-axis direction; and
arranging the laser beams comprises arranging the laser beams to enter the stacked cores.

15. A method comprising:
generating multiple laser beams;
arranging the laser beams for entry into first and second cores of an optical fiber, at least one of the first and second cores forming an optical waveguide and having an elongated cross-section with a narrower dimension in a fast-axis direction and a wider dimension in a slow-axis direction; and
transporting the laser beams using the optical fiber;
wherein:
a cladding surrounds the first and second cores, the cladding having a refractive index that differs from at least one refractive index of the first and second cores;
the optical fiber further comprises an additional core within the cladding and separated from the first and second cores, the additional core having a substantially circular cross-section; and
the method further comprises generating an additional laser beam and arranging the additional laser beam for entry into the additional core.

16. The method of claim 15, wherein:
the first core transports a high-power laser beam;
the second core transports an illumination laser beam; and
the additional core transports an alignment laser beam.

17. The method of claim 13, wherein:
the multiple cores comprise first and second cores;
the first and second cores are coaxial; and
arranging the laser beams comprises arranging the laser beams to enter the coaxial cores.

18. The method of claim 13, further comprising:
mechanically moving the optical fiber more in the fast-axis direction and less in the slow-axis direction.

19. The method of claim 13, further comprising suppressing stimulated Brillouin scattering (SBS) by at least one of:
selecting a frequency of at least one laser beam to be transported over the optical fiber so that a ratio $\delta v/\delta v_B$ of signal bandwidth $\delta v$ to SBS gain bandwidth $\delta v_B$ in the optical fiber increases SBS threshold power of the optical fiber;
using longitudinal variations in acoustic velocity where different portions of the optical fiber contain different specific concentrations of one or more dopants;
using longitudinal variations in acoustic velocity where different portions of the optical fiber operate at different temperatures; and
using transverse variations in acoustic velocity having a transverse gradient in dopant concentrations in the optical fiber.

20. The method of claim 13, further comprising:
launching multiple laser beams into the optical fiber using an optical coupler.

21. A system comprising:
multiple lasers configured to generate multiple laser beams; and
an optical fiber configured to transport the multiple beams, the optical fiber comprising:
one or more cores configured to transport the multiple beams, at least one of the one or more cores forming an optical waveguide and having an elongated cross-section with a narrower dimension in a fast-axis direction and a wider dimension in a slow-axis direction, wherein an aspect ratio of the wider dimension to the narrower dimension exceeds about 30 to 1; and
a cladding surrounding the one or more cores, the cladding having a refractive index that differs from at least one refractive index of the one or more cores.

22. The system of claim 21, wherein the one or more cores comprise a single core configured to transport at least two of the laser beams.

23. The system of claim 21, wherein:
the one or more cores comprise first and second cores; and
the first and second cores are stacked such that the first core is located at least partially over the second core in the fast-axis direction.

24. The system of claim 21, wherein:
the one or more cores comprise first and second cores; and
the first and second cores are coaxial.

25. The system of claim 21, wherein:
the one or more cores comprise first and second cores; and
the optical fiber further comprises an additional core within the cladding and separated from the first and second cores, the additional core having a substantially circular cross-section.

26. The system of claim 21, wherein the optical fiber is configured to suppress stimulated Brillouin scattering (SBS) using at least one of:
transport of at least one laser beam having a frequency selected so that a ratio $\delta v/\delta v_B$ of signal bandwidth $\delta v$ to SBS gain bandwidth $\delta v_B$ in the optical fiber increases SBS threshold power of the optical fiber;
longitudinal variations in acoustic velocity where different portions of the optical fiber contain different specific concentrations of one or more dopants;
longitudinal variations in acoustic velocity where different portions of the optical fiber operate at different temperatures; and
transverse variations in acoustic velocity having a transverse gradient in dopant concentrations in the optical fiber.

27. The system of claim 21, further comprising:
an optical coupler configured to launch the laser beams into the optical fiber.

28. The system of claim 27, wherein the optical coupler comprises one of:
at least one free space lens or mirror; and
a fused, all-glass coupler that is physically attached to an end of the optical fiber.

* * * * *